US008325175B2

(12) United States Patent
Hyun et al.

(10) Patent No.: US 8,325,175 B2
(45) Date of Patent: Dec. 4, 2012

(54) LIQUID CRYSTAL DISPLAY DEVICE WITH VOLTAGE STABILIZING UNIT AND METHOD FOR DRIVING THE SAME

(75) Inventors: Jae Won Hyun, Daegu (KR); Sung Joon Moon, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 784 days.

(21) Appl. No.: 12/155,795

(22) Filed: Jun. 10, 2008

(65) Prior Publication Data

US 2008/0303764 A1 Dec. 11, 2008

(30) Foreign Application Priority Data

Jun. 11, 2007 (KR) ........................ 10-2007-0056585

(51) Int. Cl.
*G09G 3/36* (2006.01)
*G06F 3/038* (2006.01)

(52) U.S. Cl. ........................................ 345/212; 345/100

(58) Field of Classification Search .................. 345/212, 345/87, 98, 100
See application file for complete search history.

(56) References Cited

U.S. PATENT DOCUMENTS

| | | | | |
|---|---|---|---|---|
| 4,687,956 | A * | 8/1987 | Itoh et al. | 327/108 |
| 6,014,060 | A * | 1/2000 | Nojiri | 330/297 |
| 2001/0033266 | A1* | 10/2001 | Lee | 345/94 |
| 2003/0122814 | A1* | 7/2003 | Yer | 345/211 |
| 2005/0078102 | A1* | 4/2005 | Kim | 345/204 |
| 2006/0071926 | A1* | 4/2006 | Lee et al. | 345/211 |
| 2007/0052646 | A1* | 3/2007 | Ishiguchi | 345/92 |
| 2007/0216632 | A1* | 9/2007 | Lee | 345/100 |
| 2008/0001887 | A1* | 1/2008 | Hong et al. | 345/94 |
| 2008/0123383 | A1* | 5/2008 | Shionoiri | 363/127 |

* cited by examiner

*Primary Examiner* — Chanh Nguyen
*Assistant Examiner* — Robert Stone
(74) *Attorney, Agent, or Firm* — Morgan, Lewis & Bockius LLP

(57) ABSTRACT

Liquid crystal display device and method for driving the same, which has a gate high voltage generating circuit for preventing flickering of a gate high voltage. The liquid crystal display device includes a gate high voltage generating circuit for generating a gate high voltage by using n (where n is a natural number greater than unity) pumping units and supplying the gate high voltage through an output line, and a voltage stabilizing unit for generating a gate high voltage within a range of a highest preset value by using an output voltage of the (n−1)th pumping unit in a case the gate high voltage generated at the gate high voltage generating circuit exceeds the highest preset value.

6 Claims, 3 Drawing Sheets

LIQUID CRYSTAL DISPLAY DEVICE WITH VOLTAGE STABILIZING UNIT AND METHOD FOR DRIVING THE SAME

This application claims the benefit of the Korean Patent Application No. P2007-056585, filed on Jun. 11, 2007, which is hereby incorporated by reference as if fully set forth herein.

BACKGROUND OF THE INVENTION

1. Field of the Invention

The present invention relates to a liquid crystal display device and a method for driving the same, and more particularly, to a liquid crystal display device and a method for driving the same, which has a gate high voltage generating circuit for preventing variation of a gate high voltage.

2. Discussion of the Related Art

Owing to advantages of a low operation voltage with a low power consumption, portable, and so on, the superthin flat panel display, especially, the liquid crystal display device, has a wide and variety of applications, such as notebook computers, monitors, air crafts, space crafts, and so on.

In general, the liquid crystal display device is provided with a liquid crystal display panel having two substrates bonded together opposite to each other with a liquid crystal layer in between, a gate driver and a data driver, a timing control unit for controlling the data driver and the gate driver, and a back light unit for supplying a light to the liquid crystal display panel. The liquid crystal display device displays an image by using a difference of transmissivities of lights passed through an orientation of liquid crystal molecules artificially controlled by controlling an electric field between the two substrates of the liquid crystal display panel.

The liquid crystal display device is provided with a power supply circuit for generating a gate high voltage VGH, and a gate low voltage VGL by using power from an external system for driving the gate driver.

The power supply circuit has a gate high voltage generating circuit. The gate high voltage generating circuit generates a gate high voltage VGH for applying to a gate driver of the liquid crystal display device by using charge pumping from a power source. In this instance, a highest gate high voltage VGH permitted to input is set by a gate voltage modulating circuit.

However, in a case the gate voltage modulating circuit sets the highest gate high voltage VGH, and the power is applied for generating the gate high voltage VGH, the gate high voltage VGH varies in a blanking period to cause temporary rise of the gate high voltage VGH. The rise reaches to a value exceeding the highest gate high voltage VGH set by the gate voltage modulating circuit, and if the highest gate high voltage VGH risen thus is supplied to the gate voltage modulating circuit, the gate voltage modulating circuit is damaged. Consequently, in order to prevent damage, a limitation is imposed, in which the gate high voltage VGH is set low, substantially.

SUMMARY OF THE INVENTION

Accordingly, the present invention is directed to a liquid crystal display device and a method for driving the same.

An object of the present invention is to provide a liquid crystal display device and a method for driving the same, which has a gate high voltage generating circuit for preventing the gate high voltage from variation.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device includes a gate high voltage generating circuit for generating a gate high voltage by using n (where n is a natural number greater than unity) pumping units and supplying the gate high voltage through an output line, and a voltage stabilizing unit for generating a gate high voltage within a range of a highest preset value by using an output voltage of the (n−1)th pumping unit in a case the gate high voltage generated at the gate high voltage generating circuit exceeds the highest preset value.

The voltage stabilizing unit includes a resistor and a Zener diode connected in parallel between an output terminal of the (n−1)th pumping unit and the output line.

The voltage stabilizing unit superimposes an output voltage of the (n−1)th pumping unit on a Zener voltage of the Zener diode to generate the gate high voltage within the range of the highest preset value.

In another aspect of the present invention, a method for driving a liquid crystal display device includes the steps of generating a gate high voltage by using n (where n is a natural number greater than unity) pumping units and supplying the gate high voltage through an output line, and generating a gate high voltage within a range of a highest preset value by using an output voltage of the (n−1)th pumping unit in a case the gate high voltage generated at the gate high voltage generating circuit exceeds the highest preset value.

The step of generating a gate high voltage within the range of the highest preset value includes the step of using a voltage stabilizing unit having a resistor and a Zener diode connected in parallel between an output terminal of the (n−1)th pumping unit and the output line.

The step of generating a gate high voltage lower than a highest preset value includes the step of superimposing an output voltage of the (n−1)th pumping unit on a Zener voltage of the Zener diode to generate the gate high voltage within the range of the highest preset value.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
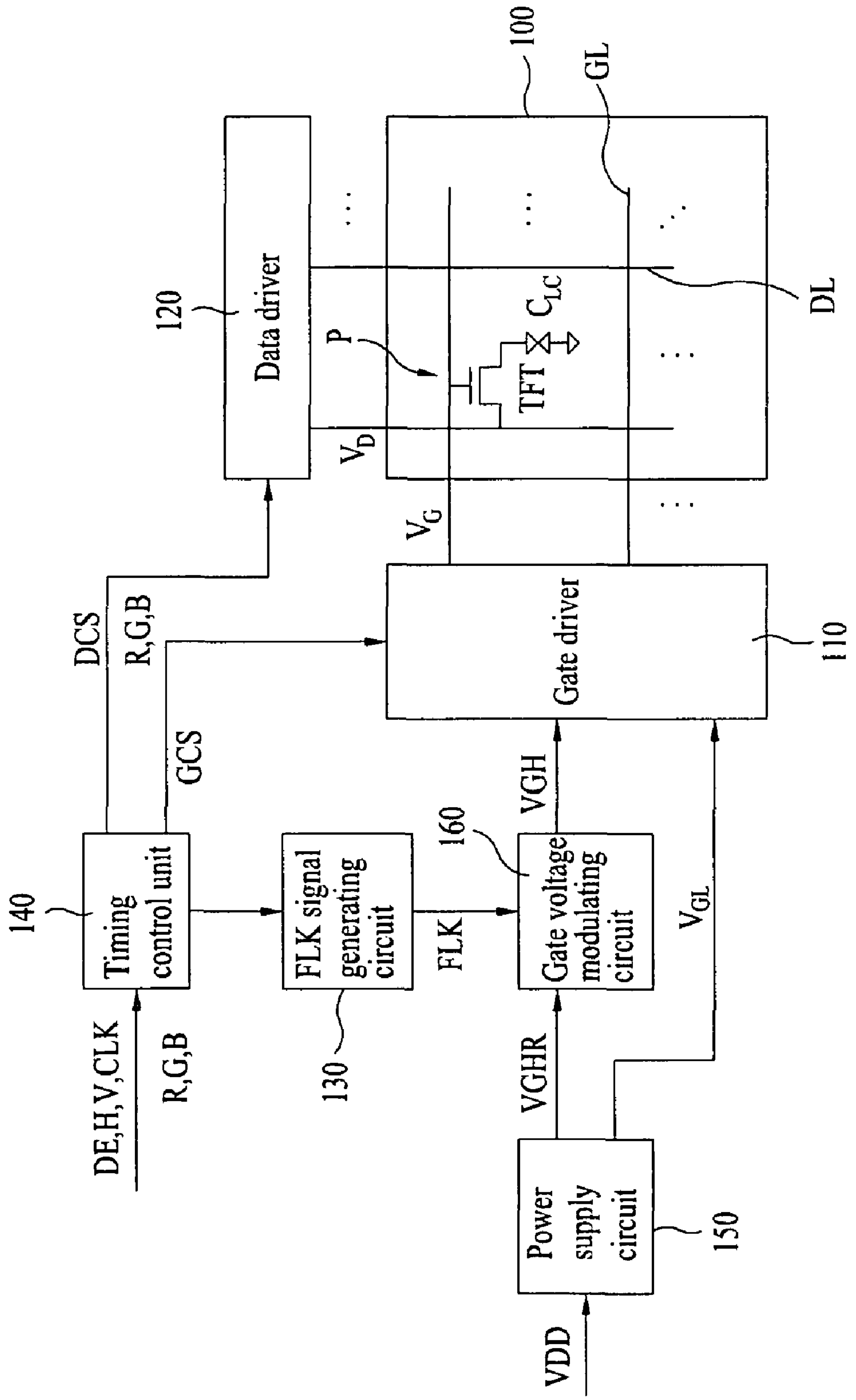
FIG. 1 is a block diagram of a circuit equivalent to a liquid crystal display device in accordance with a preferred embodiment of the present invention.

FIG. 1 is a block diagram of a circuit equivalent to a liquid crystal display device in accordance with a preferred embodiment of the present invention.

Referring to FIG. 1, the liquid crystal display device includes a liquid crystal display panel 100 having a plurality of pixels for displaying an image, a gate driver 1 10 and a data driver 120, a gate modulation control signal FLK generating circuit 130 for generating a gate modulation control signal FLK as a control signal for modulating a gate voltage, a timing control unit 140 for controlling the gate driver 110 and the data driver 120, a power supply circuit 150 for generating a driving voltage, and a gate voltage modulating circuit 160 for generating a modulated gate high voltage VGH in response to the gate modulating control signal FLK.

The timing control unit 140 receives driving signals, such as a data enable signal DE, a vertical synchronizing signal V, a horizontal synchronizing signal H, and a clock signal CLK required for driving the liquid crystal display panel and an image signal R, G, B from an outside of the liquid crystal display device. Also, the timing control unit 140 aligns the image signal R, G, B from the outside of the liquid crystal display device suitable for driving the liquid crystal display panel 100, and supplies to the data driver 120, and controls the data driver 120 and the gate driver 110 by using a gate control signal GCS and a data control signal DCS generated from the external synchronizing signals CLK, H, and V. The timing control unit 140 also controls operation of the gate modulating control signal generating circuit 130 according to an input state of the data enable signal DE.

The gate modulating control signal generating circuit 130 generates the gate modulating control signal FLK for modulating the gate high voltage VGHR for preventing flicker.

The power supply circuit 150 generates the gate high voltage VGHR, a gate low voltage VGL by using power from an outside of the liquid crystal display device. The power supply circuit 150 includes a gate high voltage generating circuit 300 for generating the gate high voltage VGHR, and a voltage stabilizing unit 400 for preventing the gate high voltage VGHR from varying.

The gate high voltage generating circuit 300 will be described in detail with reference to drawings, later.

The gate voltage modulating circuit 160 modulates the gate high voltage VGHR in response to the gate modulating control signal FLK to provide a modulated gate high voltage VGH. Because a high state and a low state of the gate modulating control signal FLK alternates repeatedly regardless of a state of the data enable signal DE, the gate high voltage VGHR is modulated even in a case the data enable signal DE is not normal identical to a case the data enable signal DE is normal.

The gate driver 110 receives the gate high voltage VGH modulated thus from the gate voltage modulating circuit 160, and generates a gate voltage VG by using the gate high voltage VGH and the gate low voltage VGL. That is, the gate driver 110 alternates the gate low voltage VGL and the modulated gate high voltage VGH thus repeatedly, to generate the gate voltage VG. The gate voltage VG is supplied to the gate lines GL in succession in response to the gate control signal GCS from the timing control unit 140.

The data driver 120 supplies a data voltage of one horizontal line to the data lines DL at every horizontal period H1, H2, . . . in response to the data control signal DCS from the timing control unit 140. Particularly, the data driver 120 converts a digital data signal R, G, B from the timing control unit 140 to an analog data voltage VD before supplying to the data lines DL.

The gate voltage VG and the data voltage VD is supplied to the gate lines GL and the data lines DL respectively and the thin film transistors TFT are turned on/off by the gate voltage VG supplied to the gate driver 110. The thin film transistors TFT are turned on by the gate high voltage VGH, and at the time the thin film transistors TFT is turned on, the data voltage VD is supplied to a liquid crystal cell CLC at the pixel region P, and stored therein until a next frame is turned on.

As an image display unit having the plurality of pixels P for displaying the image, the liquid crystal display panel 100 includes opposite two substrates, and liquid crystals between the two substrates. The liquid crystal display panel 100 includes gate lines GL and data lines DL crossed to each other to define the pixel regions P, thin film transistors TFT at portions the gate lines GL and the data lines DL crossed, and liquid crystal cells CLC connected to the thin film transistors TFT.

Figure 2:
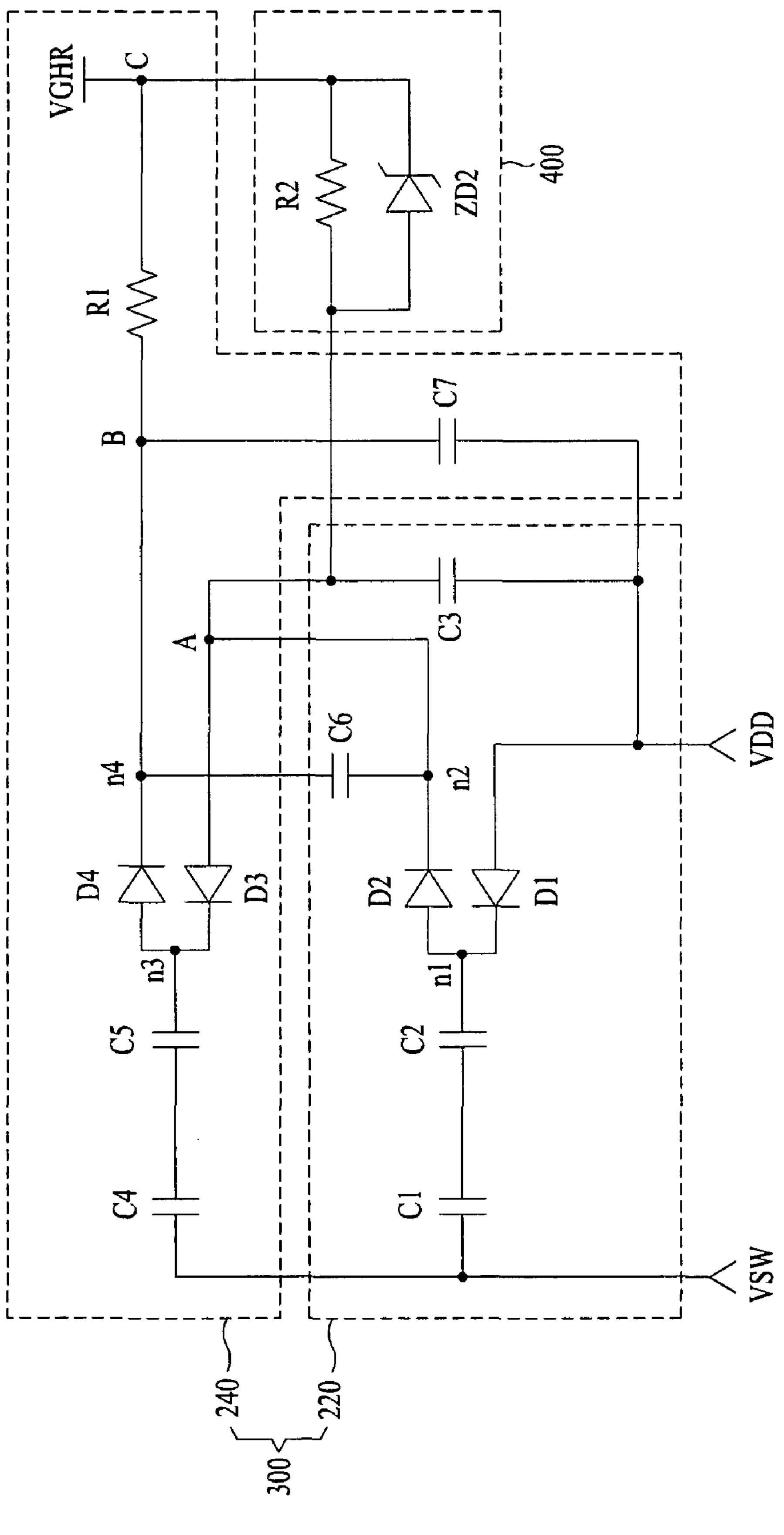
FIG. 2 is a circuit diagram of a gate high voltage generating circuit and a voltage stabilizing circuit in a power supply circuit.

FIG. 2 is a circuit diagram of the gate high voltage generating circuit and the voltage stabilizing circuit in the power supply circuit.

Referring to FIG. 2, the power supply circuit 150 of the liquid crystal display device of the present invention includes the gate high voltage generating circuit 300 and the voltage stabilizing circuit 400.

The gate high voltage generating circuit 300 includes a first pumping unit 220 for superimposing an analog driving voltage VDD on a pulse signal VSW, and a second pumping unit 240 for superimposing a first DC voltage from the first pumping unit 220 on the pulse signal VSW.

The first pumping unit 220 includes a first capacitor C1 connected to an input terminal of the pulse signal, a second capacitor C2 connected to the first capacitor C1 in series, first, and second diodes D1 and D2 connected in series having a first node n1 therebetween with the second capacitor C2 connected thereto, a third capacitor C3 connected to an input terminal of the analog driving voltage, and a sixth capacitor C6 connected to an second node n2 of a cathode terminal of the second diode D2. The first and second capacitors C1 and C2 of the first pumping unit 220 have the pulse signal VSW from the pulse signal input terminal charged thereto, and the third capacitor C3 has the analog driving voltage VDD charged thereto. The first and second diodes D1 and D2 prevent a reversing voltage, and the sixth capacitor C6 has the pulse signal VSW charged to the first and second capacitors C1 and C2 and the analog driving signal VDD from the input terminal of the analog driving voltage VDD superimposed and charged thereto.

The second pumping unit 240 includes a third diode D3 connected to a second node n2 of a cathode terminal of the second capacitor C2, a fourth diode D4 connected to the third diode D3 in series, fourth and fifth capacitors C4 and C5 connected in series and connected to a third node n3 between the third and fourth diodes D3 and D4, a seventh capacitor C7 connected to the input terminal of the analog driving voltage, and an output terminal of the gate high voltage VGHR. The first resistor R1 is connected to a fourth node n4 of the cathode terminal of the fourth diode D4.

In the second pumping unit 240, the fourth and fifth capacitors C4 and C5 have the pulse signal VSW supplied from the input terminal of the pulse signal charged thereto, and the third and fourth diodes D3 and D4 prevent a reversing voltage. The seventh capacitor C7 has the analog driving voltage VDD charged thereto, and superimposes the pulse signal VSW charged to the fourth and fifth capacitors C4 and C5 on the first DC voltage from the first pumping unit 220, and provides to an output terminal of the gate high voltage VGHR.

The voltage stabilizing unit 400 includes a second resistor R2 and a Zener diode ZD2 connected in parallel. The Zener diode ZD2 in the voltage stabilizing unit 400 is turned on if a voltage from the first pumping unit 220 exceeds the preset highest gate high voltage VGHR. The voltage from the Zener diode ZD2 turned on thus and the voltage from the first pumping unit 220 are superimposed and provided to an output terminal of the gate high voltage VGHR.

The operation of the gate high voltage generating circuit and the voltage stabilizing unit will be described in detail.

The analog driving voltage VDD is supplied to the first node n1 through the first diode D1. The analog driving voltage VDD supplied to the first node n1 thus is superimposed on the pulse signal VSW supplied through the first and second capacitors C1 and C2 connected in series. That is, the pulse signal VSW is changed to a pulse signal VSW having a level shifted as much as the analog driving voltage VDD. The level shifted pulse signal VSW is supplied to the second node n2 through the second diode D2. The level shifted pulse signal VSW supplied to the second node n2 thus is smoothened into the first DC voltage which maintains the highest voltage of the level shifted pulse signal VSW by the third capacitor C3.

The first DC voltage converted thus is supplied to the third node n3 through the third diode D3. The first DC voltage supplied to the third node n3 thus is superimposed on the pulse signal VSW supplied through the fourth and fifth capacitors C4 and C5 connected in series. That is, the pulse signal VSW is converted to a pulse signal having a level shifted as much as the first DC voltage. The pulse signal VSW having a level shifted thus is supplied to the fourth node n4 through the fourth diode D4. The pulse signal VSW having a level shifted and supplied to the fourth node n4 thus is smoothened by the sixth and seventh capacitors C6 and C7, into a second DC voltage which maintains a highest voltage of the pulse signal having a level shifted. The second DC voltage has a voltage dropped at the first resistor into a gate high voltage VGHR, and is supplied to the gate voltage modulating circuit (not shown).

If the gate high voltage VGHR generated thus exceeds the preset highest gate high voltage VGHR temporarily, the Zener diode is turned on. According to this, the gate high voltage VGHR supplied to the gate voltage modulating circuit is fixed as a superimposition of the first DC voltage on the Zener voltage of the Zener diode ZD2, and rises no more than the superimposition.

This will be described in detail taking an example with reference to the drawing.

Figure 3:
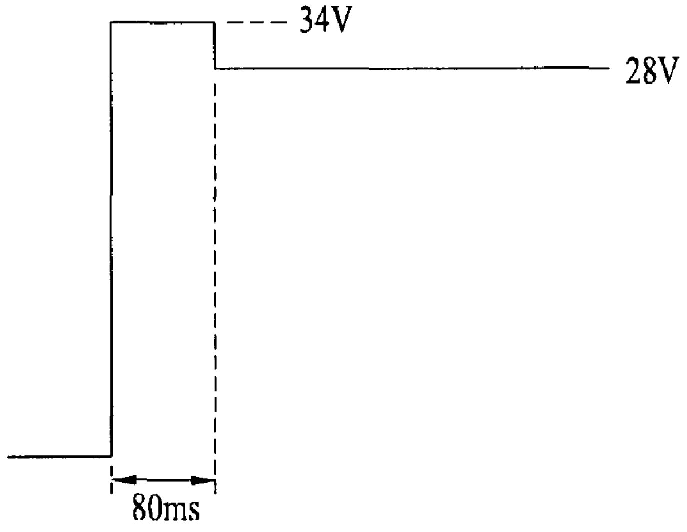
FIG. 3 is a wave diagram of waves of a gate high voltage of a related art.

Referring to FIG. 3, for an example, in a case a voltage set at the first pumping unit, i.e., the A node, is 23V, a voltage set at the second pumping unit, i.e., the B node, is 28V, and the highest voltage of the gate high voltage VGHR preset at the gate voltage modulating circuit 160 is 30V, the gate high voltage VGHR rises to 34V in a blanking period for about 80 ms period even though the voltage preset at the second pumping unit is 28V.

Figure 4:
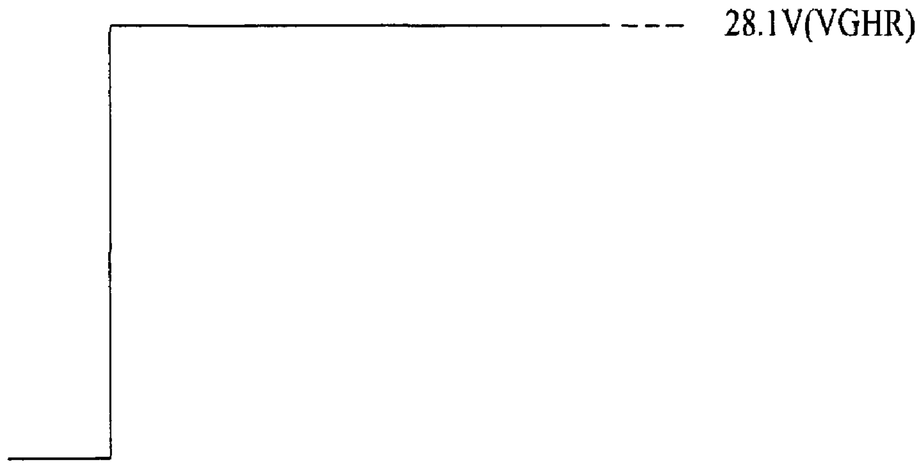
FIG. 4 is a wave diagram of waves of a gate high voltage of the present invention.

However, referring to FIG. 4, if the Zener diode ZD2 of 5.1V is mounted between the A node and the C node, the gate high voltage VGHR provided actually is 23V+5.1V, i.e., dropped to 28.1V.

Thus, the liquid crystal display device having a gate high voltage generating circuit of the present invention permits to set the gate high voltage VGHR as the user desires within a range of the highest voltage preset at the gate voltage modulating circuit by using the voltage stabilizing circuit having the gate high voltage generating circuit and the Zener diode ZD.

As has been described, the liquid crystal display device and the method for driving the same, which has a gate high voltage generating circuit permits to set a gate high voltage without limitation within the highest gate high voltage preset at the gate voltage modulating circuit owing to the voltage stabilizing unit having the Zener diode, thereby controlling rise of the gate high voltage to prevent the gate voltage modulating circuit suffer from damage.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:

a gate high voltage generating circuit for generating a gate high voltage by using n pumping units and supplying the gate high voltage through an output line, where n is a natural number greater than unity;

a voltage stabilizing unit for generating a gate high voltage within a range of a highest preset value by using an output voltage of the (n−1)th pumping unit in a case the gate high voltage generated at the gate high voltage generating circuit exceeds the highest preset value; and a gate voltage modulating circuit for modulating the gate high voltage within the range of the highest preset value in response to a gate modulating control signal to provide a modulated gate high voltage even in a case in which a data enable signal is not normal, which is identical to a case in which the data enable signal is normal, wherein a high state and a low state of the gate modulating control signal alternates repeatedly, regardless of whether the data enable signal is normal or not, and wherein the gate high voltage generating circuit comprises:

first and second diodes connected in series, first and second capacitors connected between an input terminal of a pulse signal and a node between the first and second diodes in series, third and fourth diodes connected between the output line and a cathode terminal of the second diode in series, a third capacitor comprising:

one terminal commonly connected to an anode terminal of the first diode and an analog driving voltage, and another terminal commonly connected to an anode terminal of the third diode and the voltage stabilizing unit, fourth and fifth capacitors connected between the input terminal of the pulse signal and a node between the third and fourth diodes in series, a sixth capacitor comprising:

one terminal commonly connected to the cathode terminal of the second diode and the anode terminal of the third diode, and another terminal commonly connected to the cathode terminal of the fourth diode and the output line, and a seventh capacitor connected between the one terminal of the third capacitor and the other terminal of the sixth capacitor.

2. The device as claimed in claim 1, wherein the voltage stabilizing unit includes a resistor and a Zener diode connected in parallel between an output terminal of the (n−1)th pumping unit and the output line.

3. The device as claimed in claim 2, wherein the voltage stabilizing unit superimposes an output voltage of the (n−1)th pumping unit on a Zener voltage of the Zener diode to generate the gate high voltage within the range of the highest preset value.

4. A method for driving a liquid crystal display device, the method comprising:

generating a gate high voltage by using n pumping units and supplying the gate high voltage through an output line, where n is a natural number greater than unity;

generating a gate high voltage within a range of a highest preset value by using an output voltage of the (n−1)th pumping unit in a case the gate high voltage generated at the gate high voltage generating circuit exceeds the highest preset value; and modulating the gate high voltage within the range of the highest preset value by using a gate voltage modulating circuit in response to a gate modulating control signal to provide a modulated gate high voltage even in a case in which a data enable signal is not normal, which is identical to a case in which the data enable signal is normal, wherein a high state and a low state of the gate modulating control signal alternates repeatedly, regardless of whether the data enable signal is normal or not, and wherein the gate high voltage generating circuit comprises:

first and second diodes connected in series, first and second capacitors connected between an input terminal of a pulse signal and a node between the first and second diodes in series, third and fourth diodes connected between the output line and a cathode terminal of the second diode in series, a third capacitor comprising:

one terminal commonly connected to an anode terminal of the first diode and an analog driving voltage, and another terminal commonly connected to an anode terminal of the third diode and the voltage stabilizing unit, fourth and fifth capacitors connected between the input terminal of the pulse signal and a node between the third and fourth diodes in series, a sixth capacitor comprising:

one terminal commonly connected to the cathode terminal of the second diode and the anode terminal of the third diode, and another terminal commonly connected to the cathode terminal of the fourth diode and the output line, and a seventh capacitor connected between the one terminal of the third capacitor and the other terminal of the sixth capacitor.

5. The method as claimed in claim 4, wherein the step of generating a gate high voltage within the range of the highest preset value includes the step of using a voltage stabilizing unit having a resistor and a Zener diode connected in parallel between an output terminal of the (n−1)th pumping unit and the output line.

6. The device as claimed in claim 5, wherein the step of generating a gate high voltage lower than a highest preset value includes the step of superimposing an output voltage of the (n−1)th pumping unit on a Zener voltage of the Zener diode to generate the gate high voltage within the range of the highest preset value.

* * * * *